United States Patent [19]
Alt

[11] Patent Number: 5,676,059
[45] Date of Patent: Oct. 14, 1997

[54] TRAM COORDINATING METHOD AND APPARATUS

[76] Inventor: John Darby Alt, 209 Main St., Annapolis, Md. 21401

[21] Appl. No.: 758,387

[22] Filed: Nov. 29, 1996

Related U.S. Application Data

[63] Continuation-in-part of Ser. No. 523,159, Sep. 5, 1995, Pat. No. 5,611,282.

[51] Int. Cl.⁶ ........................................ B61J 3/00
[52] U.S. Cl. .................. 104/88.06; 104/130.09; 104/139; 105/72.2; 180/401; 246/167 R; 246/187 A
[58] Field of Search .......................... 104/67, 88.03, 104/88.05, 88.06, 130.09, 139; 105/72.2, 177; 180/401; 246/2, 3, 4, 167 R, 187 A

[56] References Cited

U.S. PATENT DOCUMENTS

| | | | |
|---|---|---|---|
| 3,410,223 | 11/1968 | Miller | 104/139 |
| 3,673,967 | 7/1972 | Kropf | 104/88.05 |
| 3,853,069 | 12/1974 | Goodwin | 180/401 |
| 3,916,798 | 11/1975 | Ishii et al. | 104/139 |
| 4,231,295 | 11/1980 | Forster | 180/401 |
| 4,327,647 | 5/1982 | Eisenkolb | 104/184 |
| 4,846,073 | 7/1989 | Boyer et al. | 104/130.09 |
| 5,237,931 | 8/1993 | Riedl | 107/173.1 |
| 5,340,062 | 8/1994 | Heggestad | 246/167 R |
| 5,415,369 | 5/1995 | Hungate | 246/167 R |
| 5,611,282 | 3/1997 | Alt | 104/88.06 |

FOREIGN PATENT DOCUMENTS

| | | | |
|---|---|---|---|
| 347324 | 12/1989 | European Pat. Off. | 104/173.1 |

*Primary Examiner*—S. Joseph Morano
*Attorney, Agent, or Firm*—Arthur Schwartz

[57] ABSTRACT

A method and apparatus for coordinating the movement of a plurality of oppositely directed trams operating generally simultaneously along a single, dedicated lane, including a plurality of stop-boarding areas, a plurality of corresponding by-pass lanes, sensors along the lane to sense the location of the trams, a central processor to compare the location of the trams and calculate signals to pairs of oppositely moving trams such that they will adjust their speeds to arrive at a common stop-boarding area at substantially the same time.

20 Claims, 7 Drawing Sheets

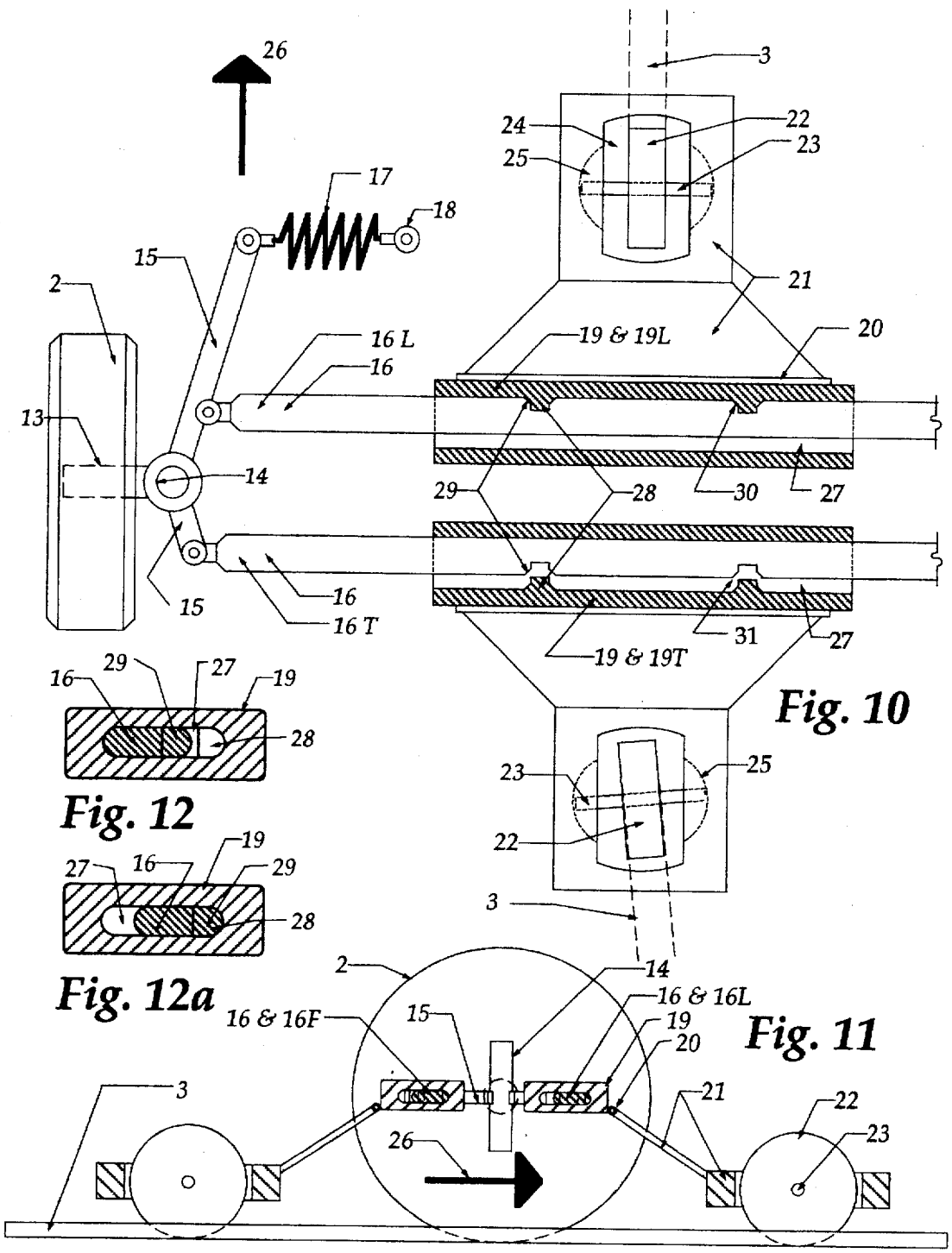

TRAM COORDINATING METHOD AND APPARATUS

CROSS REFERENCE

This is a continuation-in-part of my application Ser. No. 08/523,159 filed Sep. 5, 1995, now U.S. Pat. No. 5,611,282, which is incorporated by reference.

BACKGROUND OF THE INVENTION

The present invention relates to passenger carrying transit systems, especially transit systems operating within an urban context which are intended to transport people back and forth along a commercial street, or to transport people from an intercept parking facility located on the edge of a commercial district to locations within the district, and where there are compelling reasons for passengers to get on and off the transit vehicles at intervals along the route as, for example, where there is shopping or business activity along the route.

It is an advantage to operate such transit systems in a dedicated lane which is separate from street traffic such that the transit system can maintain its schedule and capacity in spite of local traffic congestion. It is also an advantage to locate this dedicated lane on the street plane and within the street right-of-way itself, thus eliminating the substantial costs of obtaining other rights-of-way, or the costs of constructing elevated or underground conveyance means.

To have a useful capacity such a transit system would require the operation of multiple transit vehicles in both directions along its route at the same time. It is obvious that two dedicated lanes meet this requirement by providing a separate path for transit vehicles traveling in each direction. Two dedicated lanes, however, would often require the street be widened, which is impossible in many urban contexts, or the displacement of one or more of the local traffic lanes, or the displacement of curbside parking on both sides of the street-all modifications which adversely impact the functionality of the street. If, on the other hand, transit vehicles, or trams, could be made to operate in both directions in only one dedicated lane instead of two, on-street dedicated lane transit systems would become feasible in most urban contexts. Such a single dedicated lane could be created by displacing the curbside parking on only one side of a typical street, leaving both sidewalks, traffic lanes and parking on the opposite side of the street unaffected. However, it is unobvious how to accommodate multiple, oppositely moving transit vehicles, in this single, dedicated lane.

DESCRIPTION OF THE PRIOR ART

It is known to provide a single dedicated conveyance means, such as a fixed rail, and to operate vehicles in both directions on this single rail by providing one or more by-pass rail sections along the route where one vehicle can wait while another oppositely moving vehicle safely passes, and to coordinate this waiting and passing with switches, signals or other means to ensure that collisions do not occur. This art has the disadvantage, however, of requiring one of the vehicles to stop and wait on the by-pass rail while the other vehicle approaches and passes. This condition is incompatible with the requirements of urban passenger transit which must move consistently and continuously along its route to keep passengers satisfied and to achieve adequate passenger carrying capacities in each direction at the same time.

It is also known to provide oppositely moving fixed rail, lane, or overhead suspended passenger carrying systems which utilize a single dedicated conveyance means for the greater part of the conveyance route and a double dedicated conveyance means at a center portion of the route; and where two oppositely moving vehicles travel from one end of the route to the other, passing each other at the center portion where the double conveyance means allows this passing, the vehicles reversing direction at each end of the route to repeat the cycle; and where the movement of the vehicles is coordinated to prevent them from meeting except at the center portion of the route where they are able to pass. This art has the disadvantage, however, of allowing only two vehicles to operate simultaneously. This limitation is also incompatible with the requirements of urban passenger transit which must have multiple vehicles operating in both directions simultaneously in order to have acceptable headways and passenger capacity.

It is also known to provide a resilient wheeled vehicle, which rides directly on an existing street pavement and which is steered by means of mechanical or electromagnetic interaction with a terrestrial guide means, said interaction causing the steerable wheels of the vehicle to be appropriately turned to follow the terrestrial guide. This art allows the vehicle to operate safely in a narrow lane requiring precise steering tolerances, while enabling it to be steered normally in other locations and situations. This prior art, however, as illustrated by Great Britain patent specification 1 331 678, Application No. 38880/71 and Bundesrepublik Deutschland patent specification 26 28 217 makes no allowances for the vehicle to reverse direction, as would be required in a linear single dedicated lane transit system where a tram, upon reaching the end of the route would reverse direction. In each apparatus in the above referenced cases, should the vehicle reverse direction, the wheels would be steered oppositely from that required.

It is also known to provide a terrestrial guide means which comprises a slot within which rides a guide following wheel such that a lateral force applied to the wheel by a vertical face of the slot is translated to a force which appropriately turns steerable vehicle wheels. The prior art, however, makes no special provision for installing such a terrestrial guide on the surface of an existing street such that the installation requires no cutting or patching of the existing pavement, such that the slot is self draining of rainwater, such that the guideway, thus installed, presents a low, non-hazardous profile to other vehicles which would have to drive over it, or to pedestrians who would have to walk over it, and such that the slot includes sensor and communications devices and wiring enabling the movement of trams using the slot to be coordinated; nor does the prior art provide a means for creating either straight or variable curved lengths of said surface mounted terrestrial guide slot using a standard component which may be variably curved in the field, without special tools, thus eliminating the requirement for pre-engineering and custom fabrication of guideway sections and components.

It is also known to electronically monitor the position of a plurality of vehicles in a closed transportation system and to cause signals to be sent to the vehicles such that their relative movements are coordinated to avoid collision or for other purposes. The prior art, however, makes no provision for coordinating multiple passenger carrying trams operating in both directions along a single dedicated lane such that opposing trams arrive at a common stop boarding area at substantially the same moment.

SUMMARY OF THE INVENTION

It is the object of the present invention to overcome the above drawbacks by providing a method and apparatus for a passenger carrying tram system which can operate within an urban street context, using only a single, on-street dedicated lane to accommodate multiple trams moving simultaneously and continuously in both directions.

A further object of the invention is to steer the trams within the dedicated lane by means of interaction with a terrestrial guide means such that the tram is properly steered when traveling in either direction along the route, thus allowing the tram system to be in the form of a linear path with the trams changing direction at each end of the route.

A further object of the invention is to provide a terrestrial guide slot which can be installed on the surface of an existing street, without cutting or patching the existing pavement, with a profile which does not present a bump hazard to vehicles or a tripping hazard to pedestrians, which is self draining of rainwater, which includes sensor and communications devices and wiring enabling the movement of trams using the terrestrial guide slot to be coordinated, and which can be installed in either straight or variable curved lengths using a standard component which can be curved in the field without the need for special tools.

A further object of the invention is to provide a method and an apparatus for coordinating the plurality of trams operating in both directions along a single dedicated lane such that opposing trams will arrive at a common stop boarding area at substantially the same moment.

BRIEF DESCRIPTION OF THE DRAWINGS

The present invention will be more fully understood by references to the following detailed description thereof when read in conjunction with the attached drawings, and wherein:

FIG. 10 is a top, partially cut-away view of a bidirectional steering means which follows a terrestrial guide means; and FIG. 11 is a side view of the same bidirectional steering means; and FIGS. 12 and 12A are detailed sections through the tracking rod and cylinder-slide components of the same bidirectional steering means.

DETAILED DESCRIPTION OF THE DRAWINGS

Figures 1, 2, 3, 4, 5, 6, 7, 8:
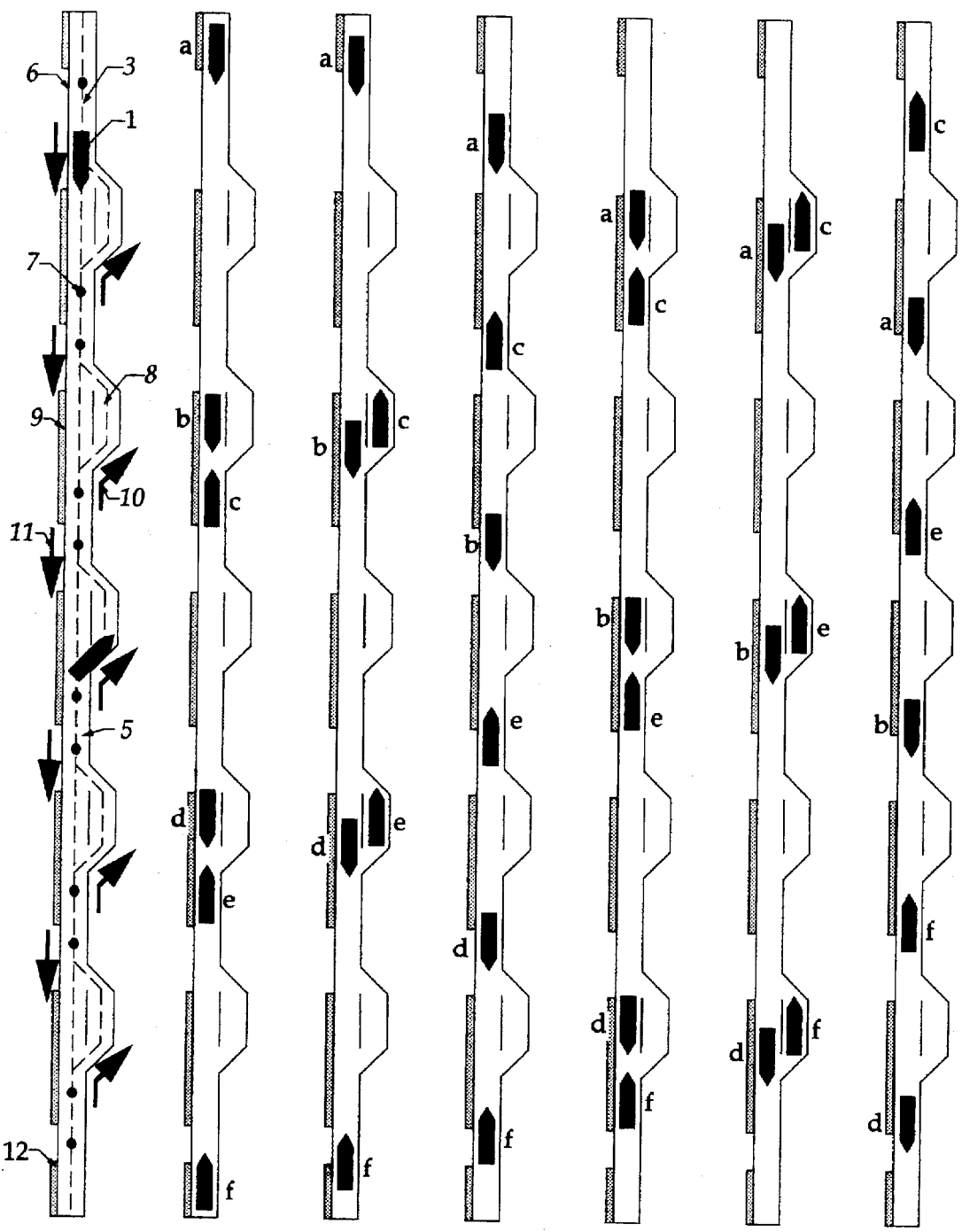
FIG. 1 is a sectional side view of a passenger carrying tram with bidirectional steering means associated with steerable wheels and a terrestrial guide means.
FIG. 2 is a diagrammatic plan view of a single dedicated lane passenger carrying tram system which includes a terrestrial guide means for steering the trams and multiple tram stop-boarding areas with associated by-pass lanes.
FIGS. 3 through 8 show sequential positions of trams operating in the system.

Looking at FIG. 1 the present invention includes multiple passenger carrying trams 1 riding on steerable wheels 2 which interact with a terrestrial guide 3 by means of a bidirectional steering apparatus 4. Looking now at FIG. 2 the present invention further includes a single dedicated lane 5 within which a terrestrial guide means 3 is located at a fixed distance from a sidewalk curb 6, multiple sensors and, or, communication devices 7, multiple by-pass lanes 8, each of which has an associated sidewalk tram stop-boarding area 9. It can be further understood from the directional arrows 10 and 11 that trams operating in one direction consistently utilize the by-pass lanes while trams traveling in the other direction do not, and that trams, upon reaching the last tram stop-boarding area 12, at opposite ends of the system, reverse direction.

Looking now at FIGS. 3 through FIG. 8, it will be noted that, for purposes of illustration, the terrestrial guide means is not drawn, the trams are drawn with points to indicate their current direction of travel, and the trams are identified by labels [a] [b] [c] [d] [e] or [f] to allow their relative movements to be identified in the subsequent figures.

Beginning with FIG. 3 all the trams are located at their respective transit stop-boarding locations. Specifically, it will be noted that trams [b] [c] and [d] [e] are opposing each other in the single dedicated lane. After passengers have boarded, trams [c] and [e] pass their opposing trams using the associated by-pass lane, as shown in FIG. 4, thus allowing all the trams to move forward in their respective directions of travel, towards their next oncoming and oppositely moving tram, as shown in FIG. 5.

In FIG. 6 each tram has arrived at its next tram stop-boarding location. It will be noted that, as passengers get on and off, trams [a] [c], [b] [e] and [d] [f] are now opposing each other in the dedicated lane. After passengers have boarded, trams [c], [e] and [f] pass their opposing trams using the associated by-pass lane, as shown in FIG. 7 thus allowing all the trams to move forward, once again, in their respective directions of travel, as shown in FIG. 8.

Referring again to FIGS. 3 through 8, it can be understood that an odd number of empty tram stop-boarding areas is required between opposing trams. Given this requirement, the maximum number of trams which can operate in a linear system as shown is equal to the total number of tram stop-boarding areas minus one. Fewer trams may also operate in the same fashion, so long as they are disposed such that the number of empty tram stop-boarding areas between opposing trams is odd.

Referring again to FIG. 2 and also FIGS. 3 through FIG. 8, it will be understood that as each tram moves along the single dedicated lane 5 it is steered by means of the terrestrial guide 3 (which, for clarity, is not shown in all figures). As each tram passes a vehicle sensor 7 located within the terrestrial guide the tram's direction and location within the system are identified, either by mechanical or electronic sensing means. This information is received by a system processor via wiring located within the terrestrial guide. The system processor compares the relative locations of the trams and sends an instruction to each tram either to increase or decrease speed. By this means, the tram drivers are able to adjust their speeds relative to each other such that opposing trams always arrive at their mutual transit stop-boarding area at substantially the same moment. This simultaneous arrival and departure from mutual transit stop-boarding locations enables the trams to operate continuously in both directions without the appearance of ever having to wait other than for passenger boarding.

Looking again at FIG. 8, it can be understood that as trams [c] and [d] arrive at the last tram stop-boarding areas at opposite ends of the route, they will reverse direction, creating a relative arrangement of trams identical to that shown in FIG. 3, thus completing one cycle which can be endlessly repeated.

Figure 9:
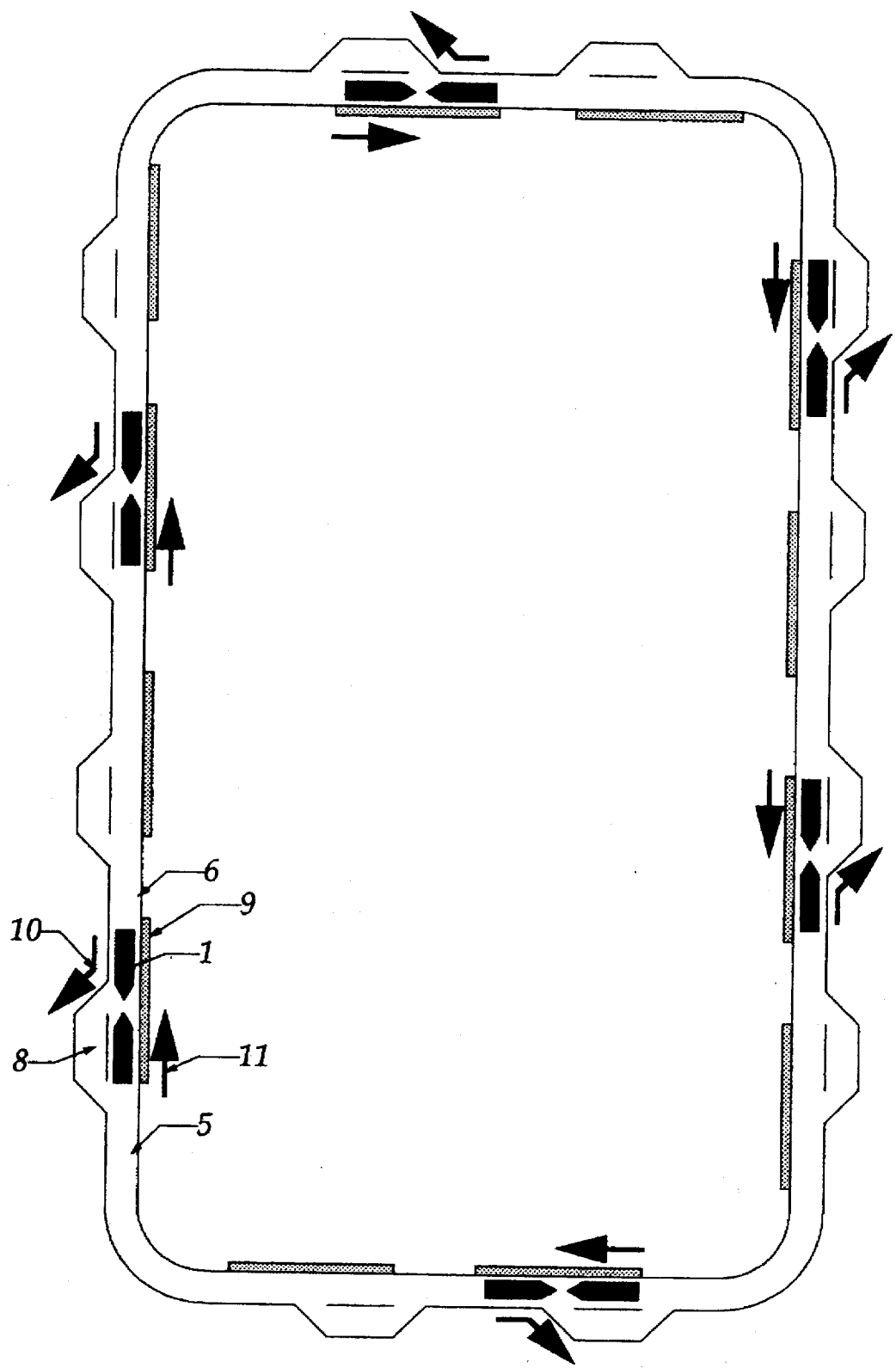
FIG. 9 is a plan view of an alternative single dedicated lane passenger carrying tram system in which the route has a loop configuration.

FIG. 9 shows an alternative single dedicated lane route, in which the dedicated lane 5 is disposed in the form of an endless loop, with tram stop-boarding areas 9, each with an associated by-pass lane 8, distributed at intervals along the route. It can be understood that the movement of the trams will proceed and be coordinated in a similar fashion as described in FIG. 3 through FIG. 8, except that the trams are never required to reverse direction. In the loop configured route, the maximum number of trams which can operate simultaneously is equal to the number of tram stop-boarding areas.

Referring again to the linear route shown in FIGS. 2 through 8, the reversal of direction required by the trams at each end station requires that the steering means which follows the terrestrial guide shall now cause the tram's steerable wheels to turn oppositely than it did before. A preferred embodiment of a steering apparatus which meets this requirement can be understood by referring to FIG. 10 which illustrates a bidirectional steering apparatus which is associated with the steerable wheels of each tram.

Looking at FIG. 10, the said bidirectional steering apparatus includes the steerable wheel 2 of an associated passenger carrying tram, a steerable axle 13 and kingpin 14 turned by means of dual linkage arms 15 and associated dual tracking rods 16, and which further includes spring and, or, damping means 17 fixed to the under carriage or frame 18 such that the steerable wheels are self-centering when no steering pressure is applied to them. (It will be understood that these components are repeated on the opposite side which is not drawn.)

Looking further at FIG. 10, now in conjunction with FIG. 11, it will be understood that the bidirectional steering apparatus comprises identical but oppositely oriented components associated with each of the dual tracking rods 16. Each of these identical but oppositely oriented components include a cylinder-slide 19 which surrounds an associated tracking rod 16 and a hinged connection 20 between the said cylinder-slide and a rigid frame 21. The rigid frame, in turn, houses a guide-following wheel 22 whose axle 23 is mounted within an opening in the rigid frame 24 such that the said wheel is able to rotate 25 as it follows a terrestrial guide means 3. These identical but oppositely oriented apparatus can be designated as leading or trailing the steerable wheels, relative to the direction of travel of the tram as indicated by the arrow 26.

Looking further at FIG. 11, it can be understood that the hinge connection 20 between the cylinder-slide 19 and the rigid frame 21 allows a relative vertical movement to occur between the associated tracking rod 16 and the guide-following wheel 22. This relative movement is necessary to accommodate variations in road surface elevations which will occur between center of the dedicated lane roadway, where the guide following wheel is situated and the edges of the roadway, where the steerable wheels are situated.

Looking now at FIG. 12 and FIG. 12a, in which the cross-sectional view of a typical tracking rod 16 and associated cylinder-slide 19 is enlarged, it can be understood that the tracking rod 16 is elongated in cross-section and that the cylinder-slide has a void 27 which is substantially the same size and shape as the steering rod cross-section, except that the void is longer in the fore and aft direction; thus the cylinder slide 19 is confined to the orientation of the tracking rod 16 while the tracking rod is able to slide fore or aft within the elongated void 27 of the cylinder-slide 19.

Looking further at FIG. 12 and FIG. 12a, now in conjunction with FIG. 10, the apparatus further includes a male cog 28 protruding into the void of the cylinder-slide component 27, and a matching female notch 29 within the opposing face of the associated tracking rod 16; it can be understood that as the tracking rod moves either fore or aft relative to the cylinder-slide component, it will either engage the male cog in the female notch, or sliding opposite, will disengage the cog from the notch.

Looking again at FIG. 10, it can be understood that when the cog and the notch are engaged 30, a lateral movement of the cylinder-slide 19 will cause a commensurate lateral movement of the tracking rod which will, in turn, cause the attached linkage arm 15 to turn the steerable wheels. This lateral force would be applied by the associated rigid frame 21 as the guide following wheel 22 follows a change in direction of the terrestrial guide means 3, thus causing the steerable tram wheels to be appropriately turned to follow the terrestrial guide. It can be further understood that when the said cog is disengaged from the said notch 31, the same lateral force will have no affect on the steerable wheels because the cylinder-slide component will slide laterally along the tracking rod in one direction or the other without applying a force to it.

Looking again at FIG. 11, it can be understood that movement of the tram wheel in the direction of the arrow 26 will cause the tracking rods 16 to slide in that same direction within the elongated voids of their associated cylinder-slide components 19. Looking now in conjunction with FIG. 10, it will be understood that this same movement will cause the cogs 28 of the leading cylinder-slide component 19L to become engaged with the notches 29 of the leading tracking rod 16L, while the same movement will cause the cogs of the trailing cylinder-slide component 19T to become disengaged from the notches of the trailing linkage rod 16T. If the tram were to reverse direction, this movement would cause the tracking rods to slide oppositely to that shown, thus reversing the cylinder-slide engagement. Thus, the lateral force applied by the terrestrial guide means will always be transferred to the leading tracking rod, relative to the direction of travel of the tram, which will cause the steerable wheels to be turned appropriately to follow the terrestrial guide, but never to the trailing tracking rod which would cause the wheels to be turned oppositely from that required.

Figure 13:
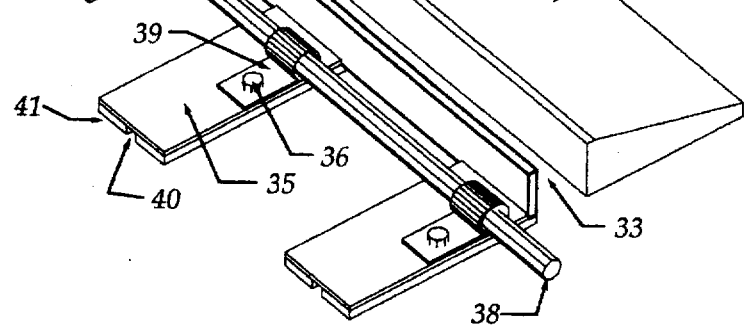
FIG. 13 is a front view and cross-section of the same bidirectional steering means and associated terrestrial guide means.

Looking now at FIG. 13, a front view of one of the dual and oppositely disposed steering components is shown with a section cut through the guide following wheel 22 and rigid frame 21, in which is shown the cylinder-slide 19, the hinged connection 20 between the cylinder slide and the rigid frame 21, the terrestrial guide following wheel 22 and its axle 23 which is free to pivot within an opening 24 within the rigid frame; and which also shows a cross section of a preferred embodiment of a terrestrial guide means which is mounted on the surface of the dedicated lane roadway 32. The said preferred embodiment of the terrestrial guide means includes similar but oppositely disposed components which are separated to form a guide slot 33 within which the guide following wheel 22 rides upon the roadway surface. Each of the terrestrial guide halves includes a vertical guide surface 34 rigidly attached to multiple horizontal mounting legs 35, attachment means 36 which fix the guide to the road surface 32, and an extruded concrete or asphalt fill 37 which encapsulates the opposite halves of the guide means after they are installed on the road surface. One of the terrestrial guide halves also includes a flexible conduit 38 for communications wiring and a conduit strap 39 which fixes the conduit to the horizontal mounting leg 35.

Figure 14:
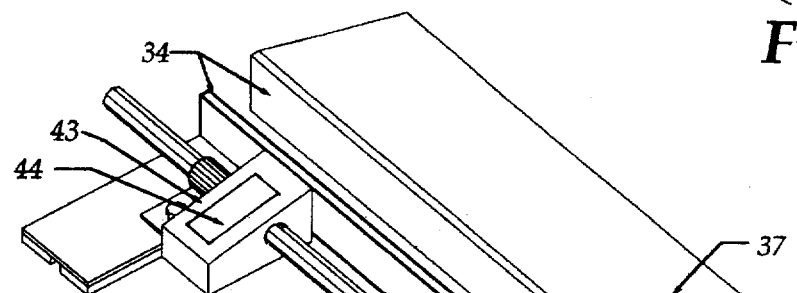
FIG. 14 is an axonometric view of the components of the terrestrial guide means.

Looking further at FIG. 13, now in conjunction with FIG. 14, it is shown that each horizontal mounting leg 35 includes on its underside an open drainage slot 40 which communicates between the guide slot 33 and the outer edge of the terrestrial guide 41 such that water may drain from the guide slot 33 outward onto the roadway 32. The upper surface of the horizontal mounting leg 35 protects the drainage slot from being filled by the concrete or asphalt extrusion.

Looking further at FIG. 14, it can be understood that the vertical guide surfaces 34 extend longitudinally the entire length of the terrestrial guide means, forming a continuous face on each side of the guide slot 33. Looking again at FIG. 13, it can be understood that the cross sectional width of the guide following wheel 22 is less than the width of the guide slot 33, such that the wheel may freely roll within the guide slot without contacting either vertical guide surface 34. It can be further understood that the cross sectional shape of the guide following wheel 22 coincides substantially with the vertical guide surfaces such that contact between the guide following wheel and one of the vertical guide surfaces will result in a lateral force being applied to the guide following wheel which is translated through the axle 23 to the rigid frame 21 and thus to the cylinder-slide 19, causing the cylinder slide to move laterally 42. If the associated tracking rod 16 is the leading tracking rod and, therefore, engaged with the cylinder-slide, this said lateral force 42 is translated to the steerable wheels, causing them to appropriately turn to follow the terrestrial guide.

Figure 15:
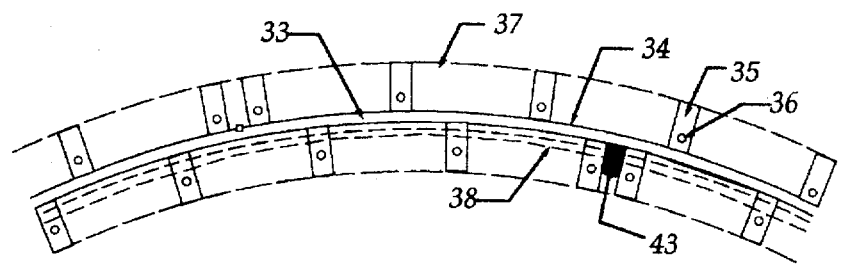
FIG. 15 is a cut-away plan view of the same components of the terrestrial guide means forming a curved section of the terrestrial guide.

Looking further at FIG. 14, now in conjunction with FIG. 15, it can be understood that the vertical guide surface 34 with its associated horizontal mounting legs 35 is made in variable lengths which can be attached to the roadway surface to form a substantially straight guide slot 33, as shown in FIG. 14, or can be curved to form a curved guide slot 33, as shown in FIG. 15. A continuous longitudinal terrestrial guide can thus be created by laying variable lengths of vertical guide surface end to end, forming straight or curved guideway slots as required. It can be understood that variable curved sections of the guideway can be created, on site, without special tools, by incrementally attaching succeeding horizontal mounting legs to the roadway and bending the vertical guide surface 34 as required between attachment points, creating a variable curve.

FIG. 14 and FIG. 15 further show that the terrestrial guide includes multiple junction box means 43 associated with the conduit for communications wiring 38. It can be understood that the said junction boxes are disposed at various intervals behind the vertical guide surface such that the upper surface will be flush with the concrete or asphalt extrusion 37, thus providing access to the junction box via a removable panel 44. The said junction boxes facilitate the pulling of communications wiring along the length of the terrestrial guideway after the concrete or asphalt extrusion has been placed, and provide housing for, and access to, sensor and communications devices which communicate with the guide slot 33.

Looking again at FIG. 2 and FIG. 9, the terrestrial guide includes switching means at the divergence to and convergence from each by-pass lane. Looking now in conjunction with FIG. 16, a preferred embodiment of these switching means is shown which include a unitary base 45, which is attached to the roadway surface with attachment means 46, and upon which are disposed rigidly attached vertical guide surfaces 47 which form a guide slot 48 which diverges from the dedicated lane guide slot 49, the said divergent guide slot being connected to a terrestrial guide means which follows the by-pass lane 50, the divergent guide slot 48 being dimensionally identical to the to the guide slot in the associated terrestrial guide means shown in FIG. 13. The switching means also includes a spring mounted pivoting gate 51 at the divergence of the guide slots, the spring, diagrammatically indicated 52 being disposed to hold the gate against the vertical guide face of the dedicated lane guide slot which continues straight 53. It can be understood that FIG. 16 shows the switch as it would be configured at the entrance to the by-pass lane, where a guide following means moving in direction B will be steered into the divergent terrestrial guide slot 48 while a guide following means moving in direction A will push the spring loaded gate aside and continue within the straight dedicated lane terrestrial guide slot 49.

Figure 16A:
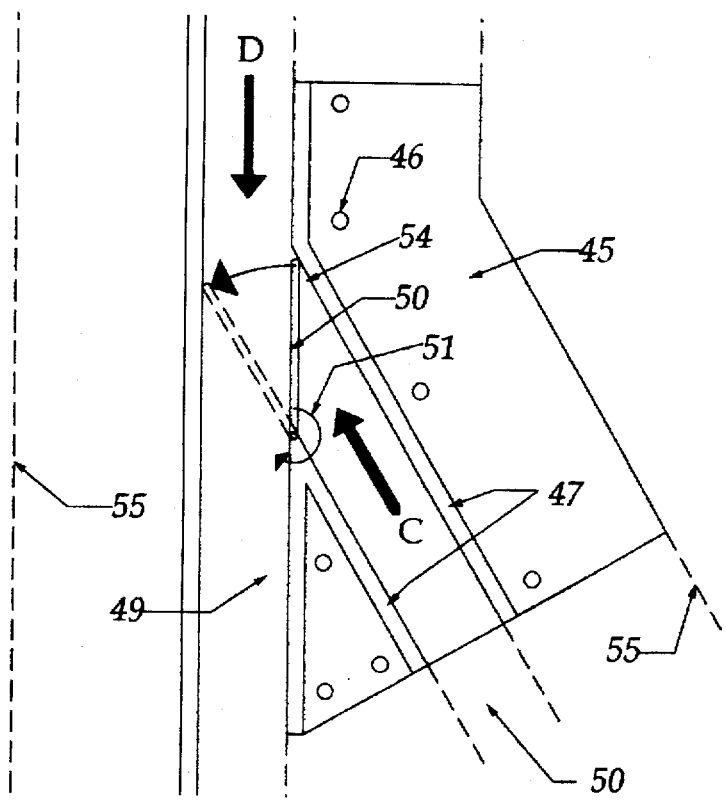
FIG. 16A is a plan view of a similar switching means which steers trams from the by-pass lane back to the dedicated lane.

Looking now at FIG. 16A it can be understood that the same switching apparatus is reversed at the exit from the by-pass lane, where the guide following means converges back onto the dedicated lane terrestrial guide slot, and wherein is shown that the spring mounted pivoting gate 50 is disposed such that the spring 51 holds the gate against the face of the divergent guide slot 54 such that the dedicated lane guide slot remains open. A guide following means moving in direction D will thus continue straight along the dedicated lane guide slot, while a guide following means moving in direction C, will push the gate aside and converge back into the dedicated lane guide slot.

Figure 16:
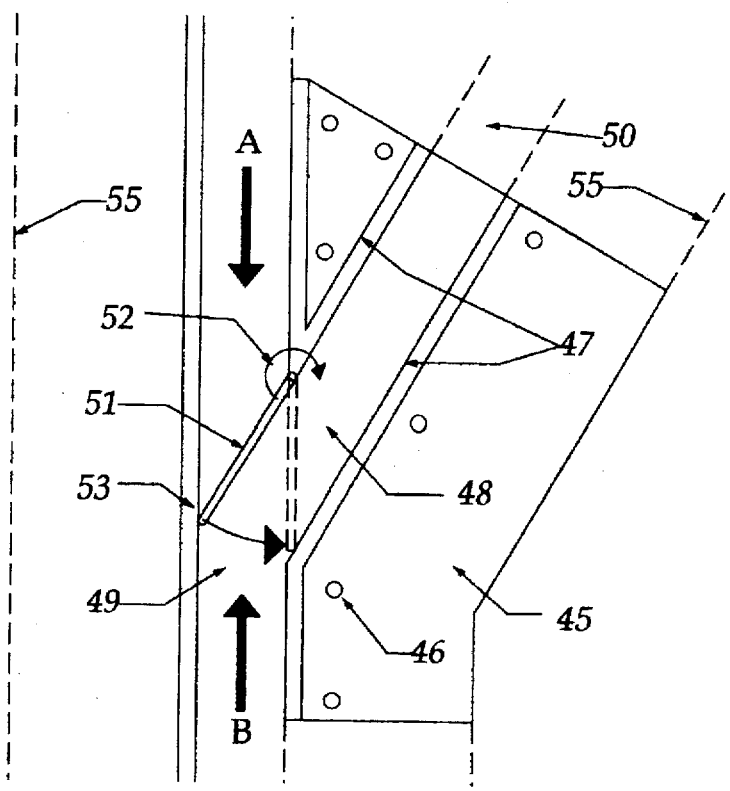
FIG. 16 is a plan view of a switching means associated with the terrestrial guide means which steers trams into a by-pass lane.

Looking further at FIG. 16 and FIG. 16A, it can be understood that the concrete or asphalt extrusion 55 is continued around the switching means, such that the smooth, beveled surface of the terrestrial guide means is continued unbroken.

Figures 17, 18, 19, 20, 21, 22:
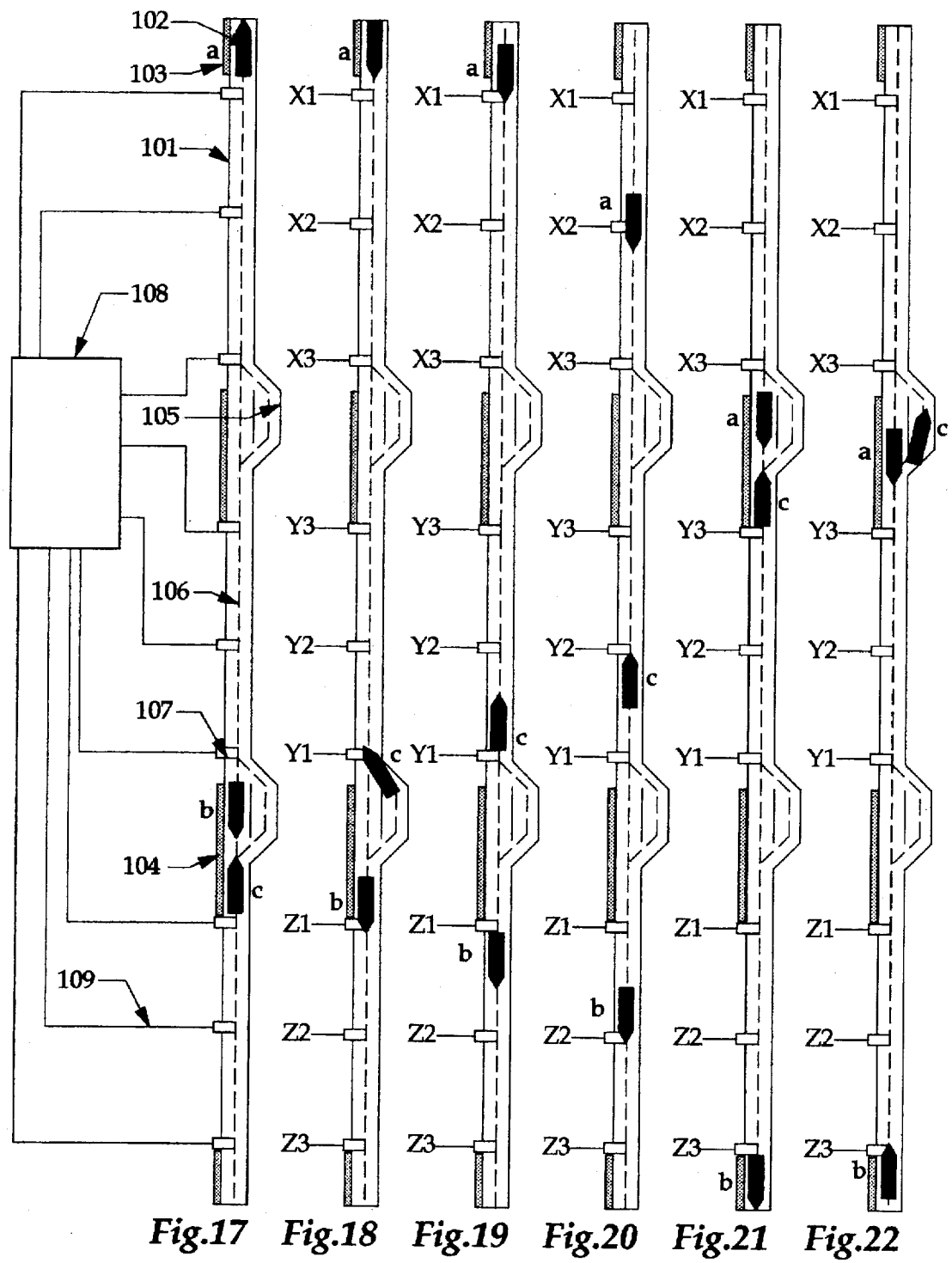
FIG. 17 is a diagrammatic plan view of a single dedicated lane passenger carrying tram system which illustrates a method of coordinating the movement of the trams.
FIGS. 18 through FIG. 22 show sequential positions of the trams being coordinated.

FIG. 17 is a diagram of a single dedicated lane passenger carrying tram coordination system which includes a single dedicated lane 101, a plurality of passenger carrying trams 102, end stop boarding areas 103 at the terminus of the single dedicated lane, a plurality of intermediate stop boarding areas 104, a by-pass lane associated with each intermediate stop boarding area 105, a terrestrial guide means to steer the trams in the dedicated lane 106, a plurality of signal actuators 107 disposed along the dedicated lane, a central processor 108 and communication lines 109 between each signal actuator and the central processor. These said communication lines could be electrical conduit, optical fiber, radio or satellite communication means. The trams are labeled, as in FIGS. 2–8, "a" "b" and "c" to allow their relative movements to be identified in subsequent figures, and their direction of travel is indicated by the pointed end of each tram.

Looking further at FIG. 17 it can be seen that the trams are shown in their stop boarding positions wherein passengers debark and embark from the trams. Upon completion of passenger debarking and embarking, it can be understood that tram "c" shall pass tram "b" using the by pass lane associated with the stop boarding area. Trams "b" and "c" will then proceed in their respective directions. Tram "a", upon completion of passenger debarking and embarking, will reverse direction and proceed back down the single dedicated lane. These movements of the trams are shown in FIGS. 18 through FIG. 22.

Looking now at FIG. 18 it can be understood that tram "a" and tram "c" are opposing each other with a common intermediate stop boarding area between them. It can be understood that the trams have the goal of reaching this common intermediate stop boarding area at substantially the same moment so both can debark and embark passengers at substantially the same time, this synchronization creating the impression, from the perspective of the passengers, that one tram never has to wait for the other to utilize the by-pass lane for clear access along the single dedicated lane.

It can be further understood that tram "b" is moving towards an end stop boarding area. While tram "b" does not have to arrive at that stop in synchronization with another tram, it can be understood that tram "b" does have the goal of maintaining relative position with tram "a" since when tram "b" arrives at the end stop boarding area and reverses direction it will then be opposing tram "a" with a common intermediate stop boarding area in between. This future position is shown in FIG. 22.

Looking again at FIG. 18 it will be seen the signal actuators can be viewed in pairs, reflecting relative positions with respect to a common stop boarding area: signal actuators X1 and Y1, for example, being furthest from the common stop boarding area, signal actuators X2 and Y2 being the next closest, and so on; or reflecting relative positions with respect to future common stop boarding areas: in this case the pairs X1-Z1, X2-Z2 and X3-Z3 reflecting the parallel relative positions of trams "a" and "b" with respect to their future common stop boarding area. Thus it can be understood that by comparing the times at which the trams reach each respective pair of signal actuators, the central processor can determine which of the trams is ahead of the other with respect to their common stop boarding area, and by how much, and using this information can cause an appropriate signal to be sent to each of the respective trams either to speed up, slow down or maintain speed.

For example, looking further at FIG. 18, it can be seen that tram "c" has left its stop boarding area and reached the signal actuator Y1 while the opposing tram "a" has been delayed and is still at its end stop boarding area. As it passes signal actuator Y1, tram "c" causes a signal to be sent to the central processor which notes which signal has been actuated and the time of actuation. Following a preprogrammed sequence, the central processor compares this information with that for the corresponding relative position signal actuator X1. In this case, the central processor finds that X1 has not yet been actuated. Having determined that the tram at signal actuator Y1 is ahead of the tram which has not yet arrived at signal actuator X1, the central processor causes signal actuator Y1 to signal tram "c" to proceed at a predetermined "slow" speed.

Looking now at the next step in the sequence as shown in FIG. 19 it can be seen that tram "a" has now left its end stop boarding area and has reached the signal actuator X1. In passing signal actuator X1, tram "a" causes a signal to be sent to the central processor which will compare the time of this actuation with the time of actuation of the corresponding relative position signal actuator Y1. Having determined the specific time differential, and knowing the predetermined "slow" speed at which tram "c" is now proceeding, the central processor will calculate a speed for tram "a" to catch up with tram "c" and cause the signal actuator X1 to signal this speed recommendation to tram "a".

Looking again at FIG. 18 it can be understood that a similar process will coordinate the speed of tram "b" which is moving toward an end stop boarding area with the goal of maintaining relative position with tram "a". Here the central processor will be comparing the relative positions of trams "a" and "b" with respect to signal actuator pairs Z1-X1, Z2-X2 and Z3-X3. In this case, however, the coordination process differs in that speed adjustment signals will only be calculated for and sent to tram "b", this being necessary since tram "a" is receiving signals coordinating it, instead, with tram "c".

Looking at FIG. 20 for example, it can be seen that tram "a" has arrived at X2 before tram "b" has arrived at the corresponding relative position signal actuator Z2. In following the preprogrammed sequence, however, the central processor will compare X2 with Y2, coordinating tram "a" with tram "c", not tram "b". When tram "b" arrives at Z2, however, the central processor, following the preprogrammed sequence, will compare Z2 with X2, noting the time differential and, knowing the recommended speed of tram "a", will calculate a speed for tram "b" to catch up with tram "a" and cause the signal actuator Z2 to signal this speed recommendation to tram "b".

It can be further understood that had tram "b" arrived at Z2 before tram "a" arrived at X2, the central processor would have compared Z2 with X2, noted that X2 had not yet been actuated, that the tram at Z2 was therefore ahead of the tram that had not yet actuated X2, and would therefore have caused signal actuator Z2 to signal tram "b" to proceed at a predetermined "slow" speed.

It can be understood that by these processes, the speed of the trams can be coordinated such that they arrive at their respective stop boarding areas at substantially the same moment as shown in FIG. 21 wherein trams "a" and "c" have arrived at their common intermediate stop boarding area and tram "b" has arrived at its end stop boarding area. It can be further understood that, as shown in FIG. 22, after the trams have completed debarking and embarking passengers, tram "c" will pass tram "a" in the by-pass lane associated with the intermediate stop boarding area, and tram "b" will reverse direction and proceed away from the end stop boarding area back up the single dedicated lane. Trams "b" and "a" will now be coordinated with respect to signal actuator pairs Z3-Y3, Z2-Y2 and Z1-Y1 as they proceed towards their common intermediated stop boarding area; tram "c" will now be coordinated with respect to signal actuator pairs X3-Z3, X2-Z2 and X1-Z1 to maintain relative position with tram "b".

Thus the plurality of trams can be coordinated to operate continuously in the single dedicated lane without colliding with each other, and without any one tram having to stop and wait for a clear path along the dedicated lane.

Figure 23:
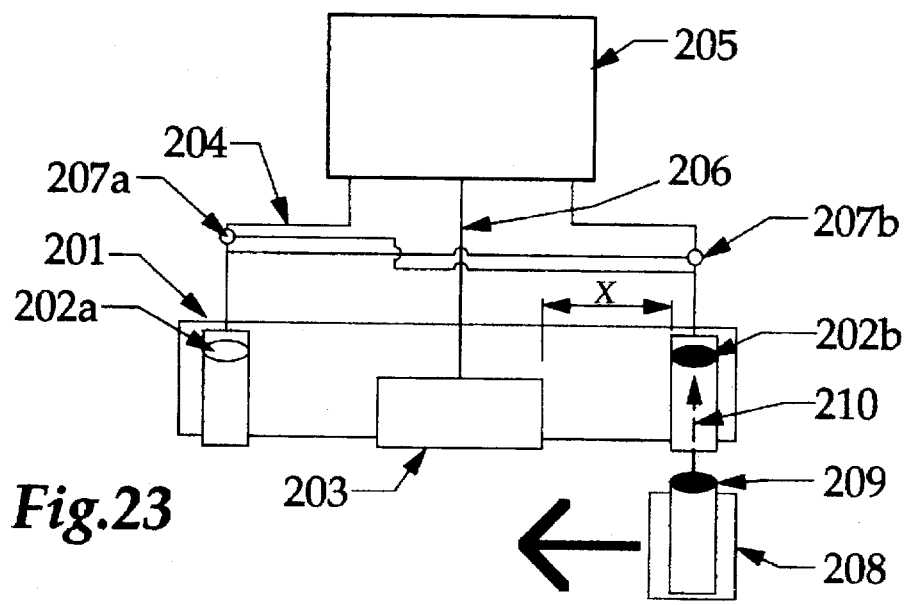
FIG. 23 is a diagrammatic view of a first preferred embodiment of a signal actuator which is utilized by the tram coordination method.

Referring again to FIGS. 17 through 22, it can be understood that each signal actuator must be capable of sending a signal from a tram to the central processor, capable of receiving a responding signal back from the central processor, and capable of passing this responding signal on to the tram; and that it must be capable of sending and receiving these said signals with respect to trams traveling in either direction along the single dedicated lane. Looking now at FIG. 23 there is shown a preferred embodiment of such a signal actuator 201 consisting of two photo-cell or electromagnetic actuators 202a and 202b, a signal display device 203 which presents a visual display to be seen by the tram driver, communication lines 204 between each of the photo-cell or electromagnetic actuators and a central processor 205; and communication lines 206 between the central processor and the signal display device. These said communication lines could be electrical conduit, optical fiber, radio or satellite communication means. Further shown in FIG. 23 are timer switches 207a and 207b which, when activated, will interrupt the signal between one or the other photo-cell or electromagnetic actuators and the central processor for a predetermined length of time; timer switch 207b, interrupting the signal from photo-cell or electromagnetic actuator 202b, is activated by photo-cell actuator 202a; timer switch 207a, interrupting the signal from photo-cell or electromagnetic 202a, is activated by photo-cell actuator 202b. Further shown is a tram based actuation devise 208 consisting of a light source or electromagnetic device 209 capable of activating the photo-cell or electromagnetic actuators 202a and 202b, and which is attached in a fixed manner to the tram (which, for purposes of clarity, is not shown).

Looking further at FIG. 23, it can be understood that the signal actuator and the tram based actuation device are disposed such that when a tram, moving in the direction indicated by the arrow, passes the signal actuator, light or electromagnetic energy from the tram based actuation device 210 will activate the signal actuator 202b, causing it to send a signal to the central processor, and causing it also to open the timer switch 207a for a predetermined period of time. While the tram continues to move in the direction indicated by the arrow, the central processor will receive the signal from the signal actuator, determine an appropriate signal for the tram (as discussed in FIGS. 17 through FIG. 22) and then cause this signal to be displayed on the signal display device 203. It can be understood that the distance "X" shall be determined by the maximum speed of the tram and the time required for the central processor to make the calculation and actuate the signal display device, such that the tram will not have passed the signal display device before the signal is displayed. It can be further understood that the timer switch 207a will stay open for a predetermined period of time to allow the tram, which is continuing in the direction indicated by the arrow, to pass photo-cell or electromagnetic actuator 202a without causing a signal to be sent to central processor.

Referring again to FIG. 23, it can be understood that a tram moving opposite to the direction shown will initiate the same process as just described, however in this case by activating photo-cell or electromagnetic actuator 202a and opening timer switch 207b.

Figure 24:
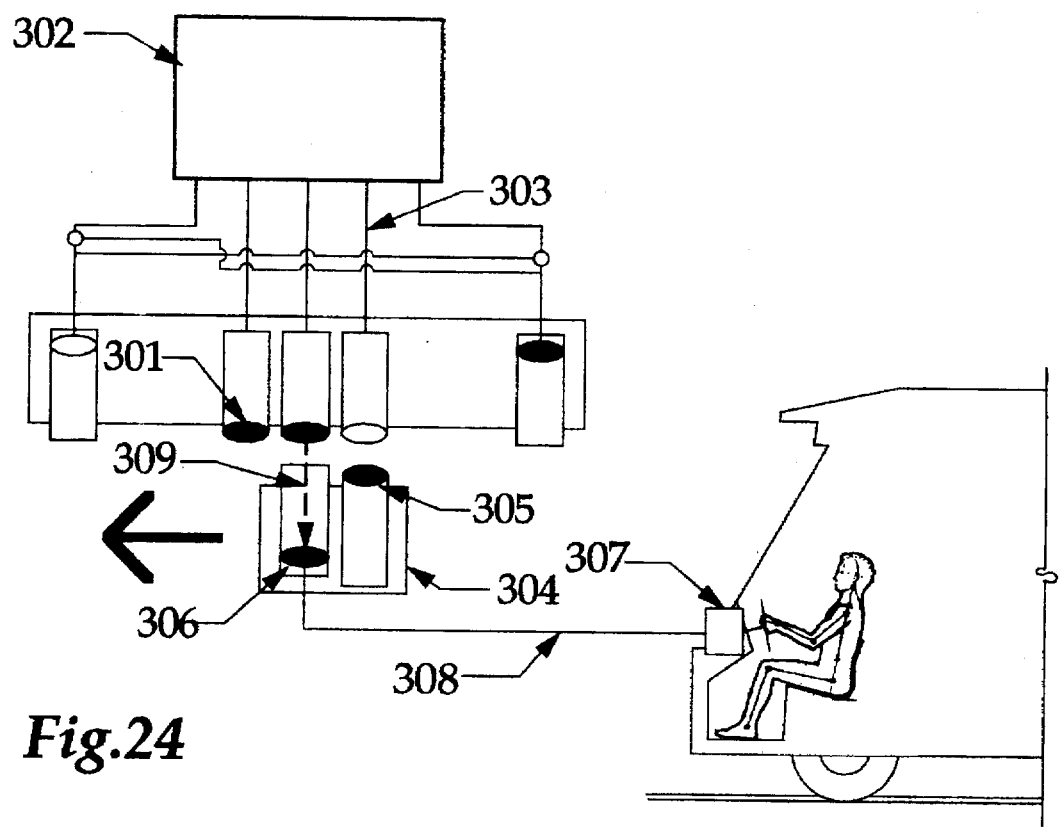
FIG. 24 is a diagrammatic view of a second preferred embodiment of a signal actuator which is utilized by the tram coordination method.

Looking now at FIG. 24, there is shown a second preferred embodiment of a signal actuator which is substantially the same as shown in FIG. 23 except the signal display device is replaced with a plurality of land-based light sources or electromagnetic devices 301 capable of activating a photo-cell or electromagnetic actuator, the central processor 302 turning the light sources or electromagnetic devices on or off by communication lines 303 with each light source or electromagnetic device. The said communication lines 303 could be electrical conduit, optical fiber, radio or satellite communication means. Further shown is a tram-based actuation device 304 comprising a light source or electromagnetic device 305 capable of activating a photo-cell or electromagnetic actuator, a tram based photo-cell or electromagnetic actuator 306, a tram-based visual display 307 located within the tram driver's cockpit, and a communication connection 308 between the tram-based photo-cell or electromagnetic actuator and the visual display.

Looking further at FIG. 24, and with reference to FIG. 23, it can be understood that a tram moving in the direction of the arrow will, by the same manner shown in FIG. 23, cause the central processor to activate certain of the land-based light sources or electromagnetic devices 301 to form a signal. It can be further understood that the light sources or electromagnetic devices comprising the signal are disposed such that when the tram-based actuation device 304 passes, light from each light source or electromagnetic energy from each electromagnetic device 309 which is turned on will activate the tram based photo-cell or electromagnetic actuator 306 which will cause a signal to be displayed on the visual display 307 in the tram driver's cockpit.

While the foregoing specification and drawings describe the construction, operation and use of two preferred embodiments of the instant invention, it is to be understood that I do not intend to limit myself to the precise constructions and arrangements herein disclosed, since various details of construction, form and arrangement may obviously be varied to a considerable extent by anyone skilled in the art without really departing from the basic principles and novel teachings of this invention and without sacrificing any of the advantages of the invention, and accordingly we intend to encompass all changes, variations, modifications and equivalents falling within the scope of the appended claims.

I claim:

1. A method of coordinating the movement of a plurality of oppositely directed trams operating along a single lane, comprising:

positioning a plurality of stop-boarding areas along the lane;

locating corresponding by-pass lanes at at least some of the stop-boarding areas;

placing a plurality of sensors along the lane;

operating a plurality of trams generally simultaneously in opposite directions along the lane;

sensing the location of the trams along the lane;

communicating the sensed location of the trams to a processor;

signalling at least certain of the trams from the processor, thereby controlling the speed of certain of the trams in relation to the location of other of the trams and thereby coordinating the arrival time of a pair of oppositely directed trams at a common stop-boarding area.

2. The method of claim 1, including coordinating the movement of the trams whereby a pair of trams arrives at a common stop-boarding area at substantially the same time.

3. The method of claim 2, including directing one of the pair of trams to continue along the lane in one direction, and directing the other of the pair of trams along the by-pass lane in the opposite direction whereby neither tram must stop to wait for a clear path on the lane.

4. The method of claim 1, including locating a plurality of signal actuators along the lane sensing the location of the trams; pairing signal actuators according to a pre-programed sequence; comparing the paired signal actuators' respective times of actuation and calculating a pre-programmed signal associated with each comparison.

5. The method of claim 4, including causing a first signal actuator to send a signal to the processor upon the passing of a tram; identifying the actuated signal actuator; pairing the first actuated signal actuator with a second signal actuator according to a pre-programmed sequence; comparing the time of actuation of the first signal actuator with the time of actuation of the second signal actuator; based on a compared time differential, processing a pre-programmed signal calculation and causing the calculated signal to be sent back to the tram.

6. A passenger carrying tram system comprising, a plurality of trams operating along a single dedicated lane;

a plurality of stop-boarding areas located along the dedicated lane;

a plurality of by-pass lanes located at at least some of the stop-boarding areas;

a plurality of signal actuators located between stop-boarding areas sensing the location of the trams along the dedicated lane;

a central processor receiving signals from the signal actuators and signalling at least one of the trams moving in a first direction and at least one tram moving in a second, opposite direction, and signalling at least one other tram moving in parallel direction with either the first or second directions, to arrive at a common stop-boarding area at substantially the same time, such that after passengers embark and debark from the trams, one tram will continue along the dedicated lane in the first direction while the other tram will continue along the by-pass lane in the second direction without requiring the trams to stop and wait for a clear path along the dedicated lane.

7. The system of claim 6, including a signal display device signalling one tram in response to the location of another tram.

8. The system of claim 7, wherein each signal actuator comprises first and second actuators, one being spaced apart from the other by a distance 2X.

9. The system of claim 8, wherein the actuators comprise photo-cells.

10. The system of claim 8 wherein the signal display device is located at a distance X from each actuator, the distance X being determined by the maximum speed of a tram and the time required for the central processor to process a signal such that a tram, traveling in a direction from either actuator toward the signal display device, will not pass the signal display device before a signal is calculated and displayed by the central processor.

11. The system of claim 8, wherein each actuator is connected to the central processor, and the central processor is connected to the signal display device.

12. The system of claim 11, wherein each signal actuator further comprises a first and a second timer switch associated with and interrupting the connection between the first and second actuators and the central processor, said timer switches being disposed such that the activation of the first actuator will cause the timer switch associated with the second actuator to interrupt its signal and vice versa; and the timer switches interrupting their respective communication connections for a pre-determined period of time such that a tram, moving in either direction, and passing both the first and second actuators, causes a signal to be received by the central processor from only one of the actuators such that, after the tram has passed both of the actuators, the switch will return to its original, signal passing position.

13. The system of claim 8 wherein the actuators are electromagnetic devices.

14. The system of claim 7, wherein each tram has a tram-based actuation device.

15. The system of claim 14, wherein the actuation device comprises a photo-cell actuating light source cooperating with photo-cell actuators.

16. The system of claim 14, wherein the plurality of signal actuators and each tram-based actuation device are disposed such that a tram, passing one of the signal actuators, causes the tram-based actuation device to activate the actuators associated with the signal actuator, thus causing a signal to be sent to the central processor; and wherein the central processor then causes a calculated signal to be displayed on the signal display device.

17. The system of claim 14, wherein the actuation device comprises an electromagnetic energy source cooperating with electromagnetic signal actuators.

18. The system of claim 7, wherein the signal display device comprises a land-based component which receives information from the central processor, and a tram-based component which displays the signal.

19. The system of claim 18, wherein the land-based component of the signal display device comprises a plurality of photo-cell actuating light sources connected to the central processor, and wherein the central processor energizes and deenergizes the light sources in a calculated on-off sequence; and the tram-based component of the signal display device comprises at least one photo-cell actuator connected to a tram-based display device; and wherein as a tram passes in either direction, the on-off sequence of the land-based photo-cell actuating light sources will activate the tram-based photo-cell actuator, causing a sequence of signals to be sent to the tram-based display device.

20. The system of claim 18, wherein the land-based component of the signal display device comprises a plurality of electromagnetic energy sources connected to the central processor, and wherein the central processor energizes and deenergizes the electromagnetic energy sources in a calculated on-off sequence; and the tram-based component of the signal display device comprises at least one electromagnetic actuator connected to a tram-based display device; and wherein as a tram passes in either direction, the on-off sequence of the land-based electromagnetic energy sources will activate the tram-based electromagnetic actuator, causing a sequence of signals to be sent to the tram-based display device.

* * * * *